(12) United States Patent
Fitzpatrick et al.

(10) Patent No.: US 11,938,850 B2
(45) Date of Patent: Mar. 26, 2024

(54) VEHICLE SEAT CUSHION WITH INTEGRATED VENTILATION

(71) Applicant: Faurecia Automotive Seating, LLC, Auburn Hills, MI (US)

(72) Inventors: Robert C. Fitzpatrick, Auburn Hills, MI (US); Jeffery T. Bonk, Chesterfield, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 71 days.

(21) Appl. No.: 17/880,198

(22) Filed: Aug. 3, 2022

(65) Prior Publication Data

US 2024/0042907 A1 Feb. 8, 2024

(51) Int. Cl.
*B60N 2/70* (2006.01)
*B60N 2/56* (2006.01)
*B60N 2/64* (2006.01)
*B33Y 80/00* (2015.01)

(52) U.S. Cl.
CPC ......... *B60N 2/5642* (2013.01); *B60N 2/5657* (2013.01); *B33Y 80/00* (2014.12)

(58) Field of Classification Search
CPC .. B60N 2/5657; B60N 2/5635; B60N 2/7017; B60N 2/56; B60N 2/646; B60N 2/70; B60N 2/5642
See application file for complete search history.

(56) References Cited

U.S. PATENT DOCUMENTS

| 5,670,232 | A * | 9/1997 | Bigolin | B29C 44/12 |
| | | | | 428/68 |
| 5,934,748 | A * | 8/1999 | Faust | B60N 2/5635 |
| | | | | 297/180.12 |
| 11,691,739 | B2 * | 7/2023 | Pirklbauer | B64D 11/0647 |
| | | | | 297/452.56 |
| 11,738,671 | B2 * | 8/2023 | Hoshi | B60N 2/5607 |
| | | | | 297/180.1 |
| 2005/0264052 | A1 * | 12/2005 | Dellanno | B60R 21/04 |
| | | | | 297/216.12 |
| 2011/0169320 | A1 * | 7/2011 | Koeppe | B29C 70/025 |
| | | | | 297/452.48 |
| 2011/0260509 | A1 | 10/2011 | Siu | |
| 2015/0266405 | A1 * | 9/2015 | Fitzpatrick | B60N 2/5692 |
| | | | | 297/180.12 |
| 2016/0167260 | A1 * | 6/2016 | Thomas | B32B 27/32 |
| | | | | 428/304.4 |
| 2018/0056826 | A1 * | 3/2018 | Boland | B60N 2/646 |
| 2018/0251919 | A1 * | 9/2018 | Mankame | B32B 5/022 |
| 2019/0183249 | A1 * | 6/2019 | Oomen | A47C 7/74 |
| 2019/0351787 | A1 | 11/2019 | Lodhia | |
| 2019/0375316 | A1 * | 12/2019 | Arata | B60N 2/7017 |
| 2022/0089074 | A1 * | 3/2022 | Witte | B32B 5/18 |

(Continued)

FOREIGN PATENT DOCUMENTS

KR 101054489 B1 8/2011
WO 2020128444 A1 6/2020

*Primary Examiner* — Shin H Kim
(74) *Attorney, Agent, or Firm* — Barnes & Thornburg LLP

(57) ABSTRACT

A vehicle seat includes a seat bottom and a seat back extending upwardly from the seat bottom. A cushion is included in each of the seat bottom and seat back. A stream of air is provided to at least one of the seat bottom and the seat back to provide a ventilated vehicle seat for a passenger seated on the vehicle seat.

20 Claims, 4 Drawing Sheets

(56) References Cited

U.S. PATENT DOCUMENTS

| | | | |
|---|---|---|---|
| 2023/0150408 A1* | 5/2023 | Taylor | B60N 2/686 297/452.55 |
| 2023/0219474 A1* | 7/2023 | Maloney | B60N 2/7017 297/452.26 |
| 2023/0311726 A1* | 10/2023 | Reader | B60N 2/565 297/180.14 |

* cited by examiner

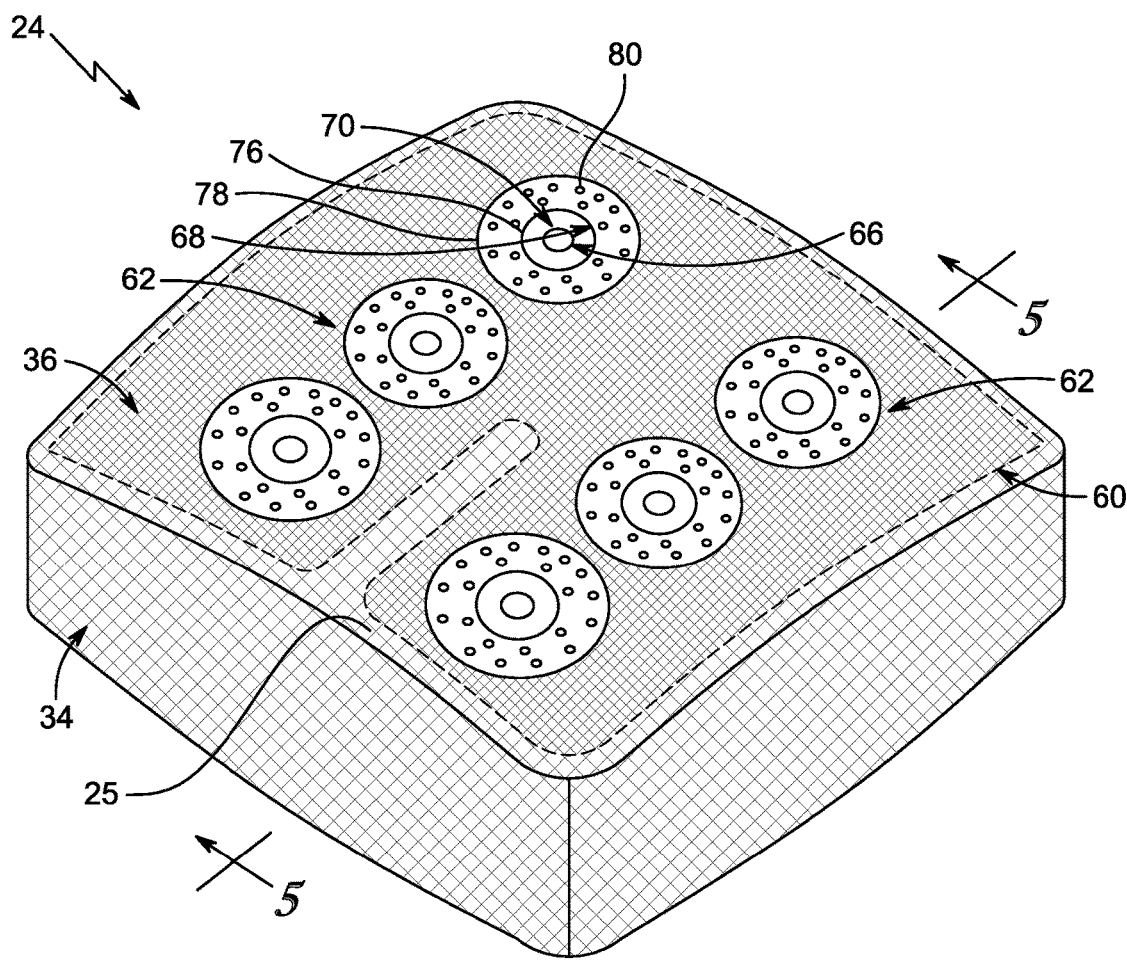
FIG. 3
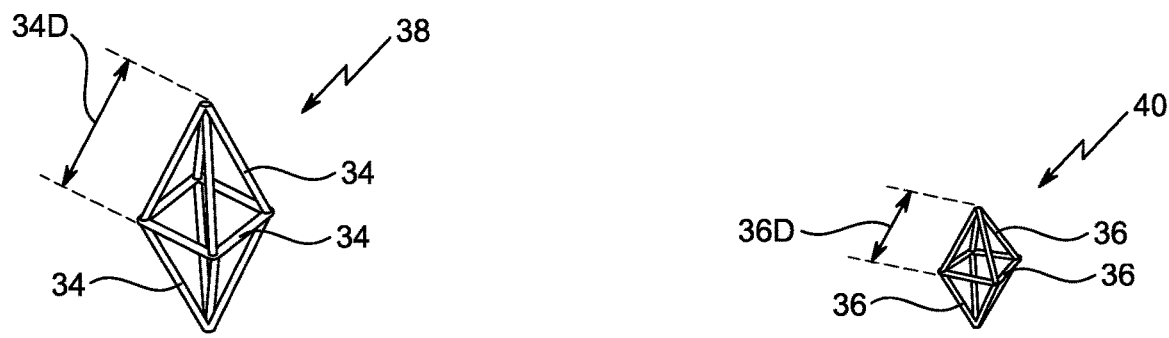
FIG. 4A                    FIG. 4B

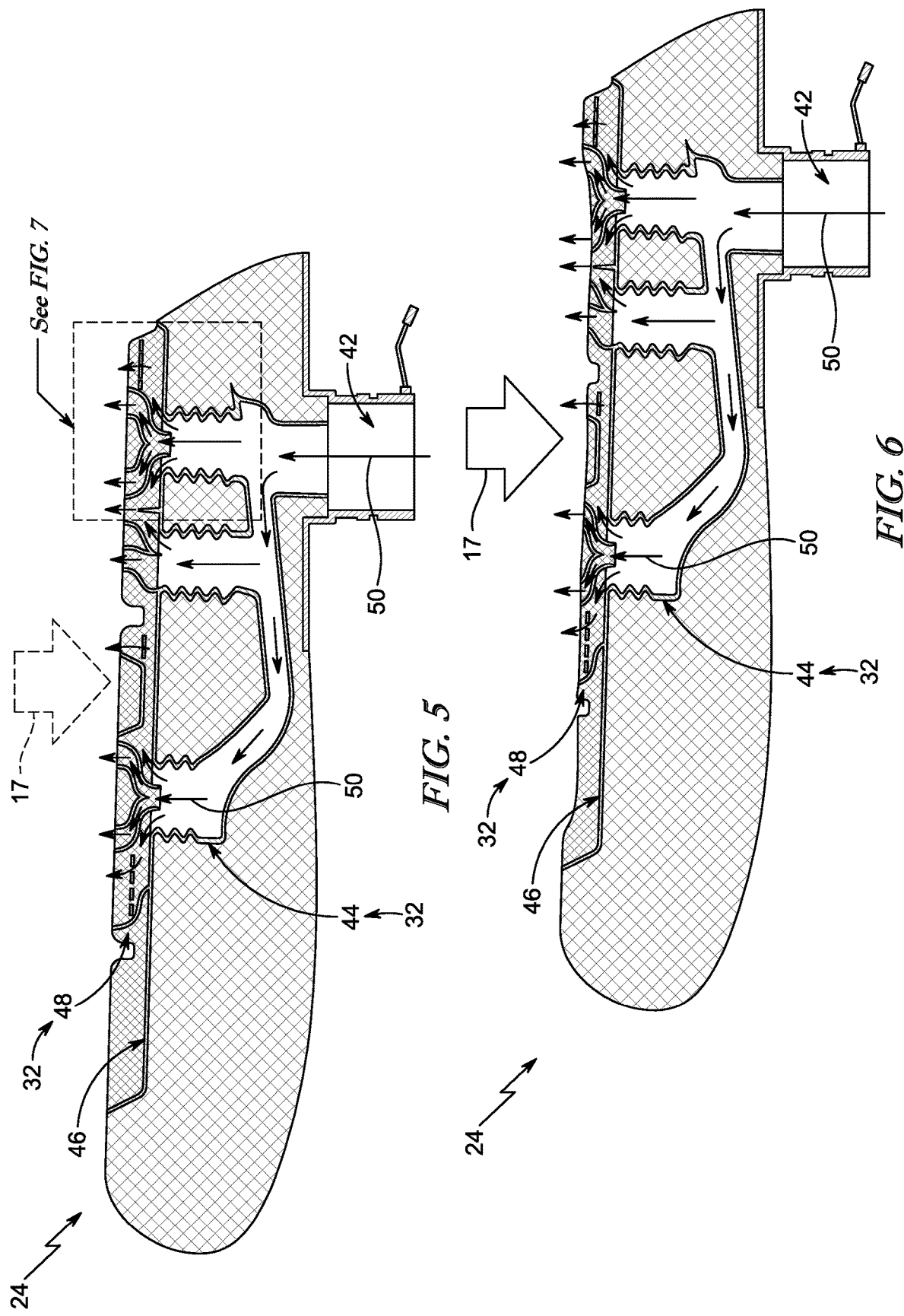

VEHICLE SEAT CUSHION WITH INTEGRATED VENTILATION

BACKGROUND

The present disclosure relates to a vehicle seat, and particularly to a vehicle seat including a seat bottom and seat back. More particularly, the present disclosure relates to a ventilated vehicle seat.

SUMMARY

A ventilated vehicle seat in accordance with the present disclosure includes a seat foundation adapted to be coupled to a floor of a vehicle, a seat bottom coupled to the seat foundation and spaced apart from the floor, and a seat back coupled to the seat bottom and extending upwardly from the seat bottom. At least one of the seat bottom and the seat back include an outer trim and a cushion covered by the outer trim.

In illustrative embodiments, the cushion includes a suspension system and an air-management system. The suspension system has a first plurality of suspension links which define a first plurality of repeated cells and a second plurality of suspension links which define a second plurality of repeated cells. The first plurality of repeated cells are different than the second plurality of repeated cells. The air management system has a manifold which receives pressurized air, a plurality of conduits coupled to the manifold, and a fluid barrier which is arranged to lie between the first plurality of suspension links and the second plurality of suspension links. The plurality of conduits direct the pressurized air from the manifold toward different areas of the second plurality of suspension links. After the pressurized air is discharged from the plurality of conduits to the second plurality of suspension links, the fluid barrier blocks the flow of air from the second plurality of suspension links to the first plurality of suspension links.

In illustrative embodiments, the cushion is formed by additive manufacturing so that the suspension system and the air-management system are connected to one another in one piece. The first plurality of repeated cells and the second plurality of repeated cells are fluidly connected to one another so that air is free to flow therethrough to the occupant.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 3 is a perspective view of the cushion of FIG. 2 showing that the suspension system includes a first plurality of suspension links and a second plurality of suspension links arranged to lie above the first plurality of suspension links, and showing that the air-management system includes perimeter airflow barrier and a plurality of primary flow-discharge nozzles to direct pressurized air to the occupant of the ventilated vehicle seat;

FIG. 4A is a perspective view of some of the first plurality of suspension links coupled to one another to form a first cell that is repeated in the cushion to form a first plurality of repeated cells;

FIG. 4B is a perspective view of some of the second plurality of suspension links coupled to one another to form a second cell that is repeated in the cushion to form a second plurality of repeated cells;

FIG. 5 is a section view of the cushion of FIG. 2 showing that the air-management system includes a plurality of conduits to direct pressurized air toward different areas of the second plurality of suspension links, a flow-directing skeleton integrated into the second plurality of suspension links to disperse pressurized air exiting through each conduit toward the occupant, and a fluid barrier arranged to lie between the first plurality of suspension links and the second plurality of suspension links;

FIG. 6 is a sectional view of the cushion of FIG. 5 showing the occupant seated on the seat bottom to compress the first and second plurality of repeated cells and suggesting that the flow of the pressurized air to the occupant is not hindered.

DETAILED DESCRIPTION

Figure 1:
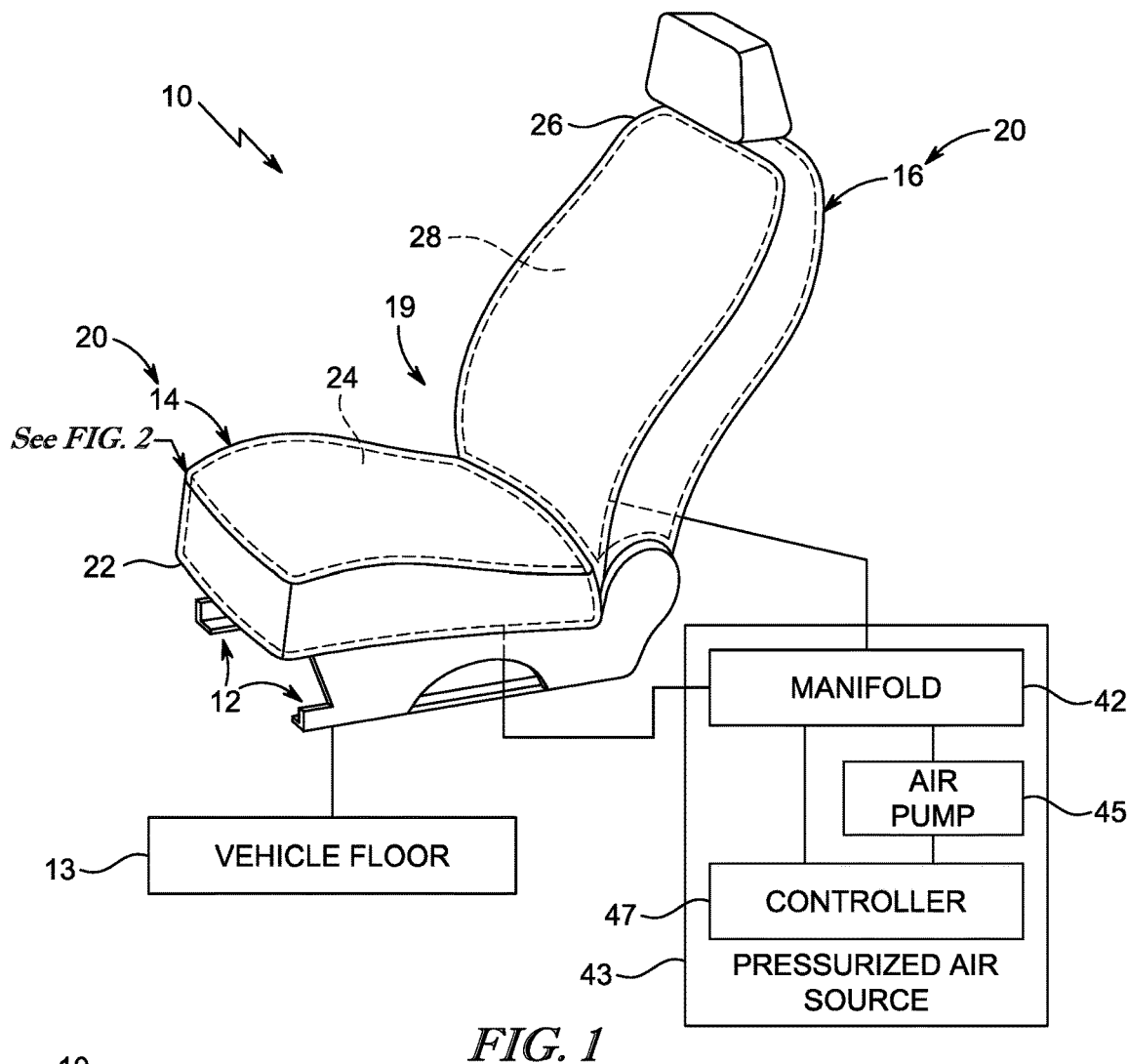
FIG. 1 is a perspective and diagrammatic view of a ventilated vehicle seat, in accordance with the present disclosure, showing a pressurized air source coupled in fluid communication to a cushion included in the seat bottom and to a cushion included in the seat back.

A ventilated vehicle seat 10 includes a foundation 12 adapted to be anchored to a vehicle floor 13, a seat bottom 14 mounted on foundation 12, and a seat back 16 arranged to extend upwardly away from seat bottom 14 as suggested in FIG. 1. Ventilated vehicle seat 10 may also be referred to as an occupant support 10. Ventilated vehicle seat 10 is coupled to a pressurized air source 43 to provide pressurized air 50 to seat bottom 14 and seat back 16 to provide ventilation to a passenger or occupant (not shown) sitting on ventilated vehicle seat 10.

A cushion 24 of seat bottom 14 is additively manufactured to include a suspension system 30 to support an occupant and an air-management system 32 to direct pressurized air 50 to the occupant. Suspension system 30 includes a first plurality of suspension links 34 which define a first plurality of repeated cells 38 and a second plurality of suspension links 36 above the first plurality of suspension links 34 and which define a second plurality of repeated cells 40. Air-management system 32 includes a plurality of conduits 44 formed at least in the first plurality of suspension links 34 and a flow-directing skeleton 48 formed at least in the second plurality of suspension links 36. Pressurized air 50 flows from a manifold 42 of air-management system 32 through the plurality of conduits 44 and flow-directing skeleton 48 towards an occupant. All components of cushion 24 may be connected endlessly to one another through additive manufacturing of cushion 24.

Seat bottom 14 and seat back 16 cooperate to define an occupant-support region 19 adapted to support an occupant above vehicle floor 13 as shown in FIG. 1. Seat bottom 14 is coupled to seat foundation 12 and spaced apart from vehicle floor 13, while seat back 16 is coupled to seat bottom 14 and is arranged to extend upwardly from seat bottom 14 and seat foundation 12. In some embodiments, occupant support 10 may include an occupant-support base 20 which includes at least one of seat bottom 14 and seat back 16.

Seat bottom 14 includes an outer trim 22 and a seat-bottom cushion 24 at least partially covered by outer trim 22 as shown diagrammatically in FIG. 1 and illustratively in FIGS. 2-7. In some embodiments, seat back 16 also includes an outer trim 26 and a seat-back cushion 28 at least partially covered by outer trim 26 as shown diagrammatically in FIG. 1. Seat-bottom cushion 24 is formed in one piece by additive manufacturing so that each component of seat-bottom cushion 24 is connected endlessly to one another. Seat-bottom cushion 24 includes a suspension system 30 to support and provide cushioning for an occupant and an air-management system 32 to disperse and/or direct pressurized air 50 to an occupant seated on seat bottom 14 in occupant-support region 19. Additionally or alternatively, seat-back cushion 28 may also be formed in one piece by additive manufacturing and include a suspension system 30 and an air management system 32. Only seat-bottom cushion 24 is described herein, and the disclosure of seat-bottom cushion 24 is incorporated by reference for seat-back cushion 28. In some embodiments, seat-bottom cushion 24 and/or seat-back cushion 28 may be formed without any metallic, structural seat frame elements.

Figure 2:
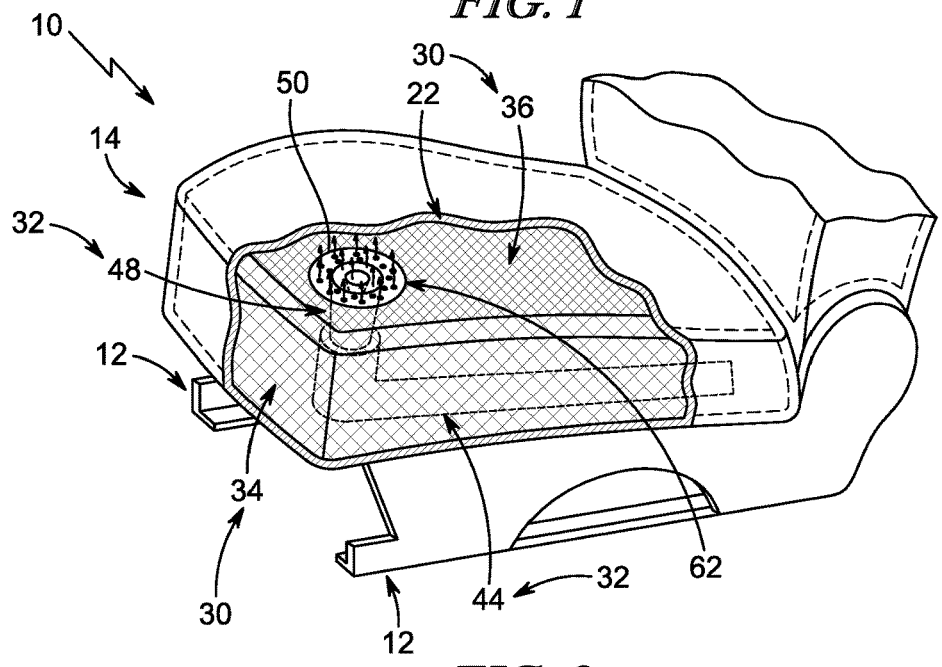
FIG. 2 is an enlarged perspective view of the cushion included in the seat bottom of FIG. 1 showing that the cushion includes a suspension system and an air-management system to disperse pressurized air to an occupant of the ventilated vehicle seat.

Suspension system 30 includes a first plurality of suspension links 34 and a second plurality of suspension links 36 as shown in FIGS. 2-3. The first plurality of suspension links 34 defines a first plurality of repeated cells 38 as shown in FIGS. 3 and 4A, and the second plurality of suspension links 36 defines a second plurality of repeated cells 40 arranged to lie above the first plurality of repeated cells 38 as shown in FIGS. 3 and 4B. The first plurality of repeated cells 38 are different than the second plurality of repeated cells 40 as illustrated, for example, in FIGS. 3-4B. In some embodiments, as illustrated in FIG. 3, each of the first plurality of repeated cells 38 has a first volume greater than a second volume of each of the second plurality of repeated cells 40. Additionally or alternatively, the first plurality of suspension links 34 may each have a first thickness greater than a second thickness of each of the second plurality of suspension links 36. In some embodiments the first plurality of suspension links 34 may have a first stiffness greater than a second stiffness of the second plurality of suspension links 36.

As shown in FIGS. 4A and 4B, each of the first plurality of repeated cells 38 and/or each of the second plurality of repeated cells 40 may each have a diamond structure. A first distance 34D between a first end and a second end of one of the first plurality of suspension links 34 may be greater than a second distance 36D between a first end and a second end of one of the second plurality of suspension links 36. Therefore, the second plurality of suspension links 36 and the second plurality of repeated cells 40 have a greater density within cushion 24 than the first plurality of suspension links 34 and the first plurality of repeated cells 38. In other embodiments, each of the first plurality of repeated cells 38 and/or each of the second plurality of repeated cells 40 may have a different 3-dimensional structure provided by suspension links 34, 36.

Pressurized air 50 has about the same flow rate through cushion 24 when cushion 24 is in an undeformed state, as shown in FIG. 5, and a deformed state, as shown in FIG. 6. The undeformed state is prior to the an occupant applying a load 17 on seat bottom 14, whereas the deformed state is in response to the load 17 being applied on seat bottom 14. Pressurized air 50 flowing through the second plurality of cushion links 36 has a first flow rate in the undeformed state and a second flow rate in the deformed state. The second flow rate is about equal to the first flow rate due to air-management system 32.

Air-management system 32 includes a plurality of conduits 44, a fluid barrier 46, and a flow-directing skeleton 48. Manifold 42 receives pressurized air 50 from pressurized air source 43. The plurality of conduits 44 are coupled to manifold 42 and direct pressurized air 50 to different areas of the second plurality of suspension links 36 and the occupant seated thereon. Fluid barrier 46 lies between the first plurality of suspension links 34 and the second plurality of suspension links 36. Flow-directing skeleton 48 is integrated into the second plurality of suspension links 36.

Pressurized air source 43 includes manifold 42, an air pump 45, and a controller 47 coupled to air pump 45 and/or manifold 42. Controller 47 is used by a user and/or a control system of a vehicle (not shown) to actuate air pump 45 or any other suitable alternative to generate a flow of pressurized air 50 that is conducted into manifold 42 and to conduits 44. It is within the present disclosure to use any suitable pressurized air source to provide pressurized air 50 to manifold 42 and/or air-management system 32.

Figure 7:
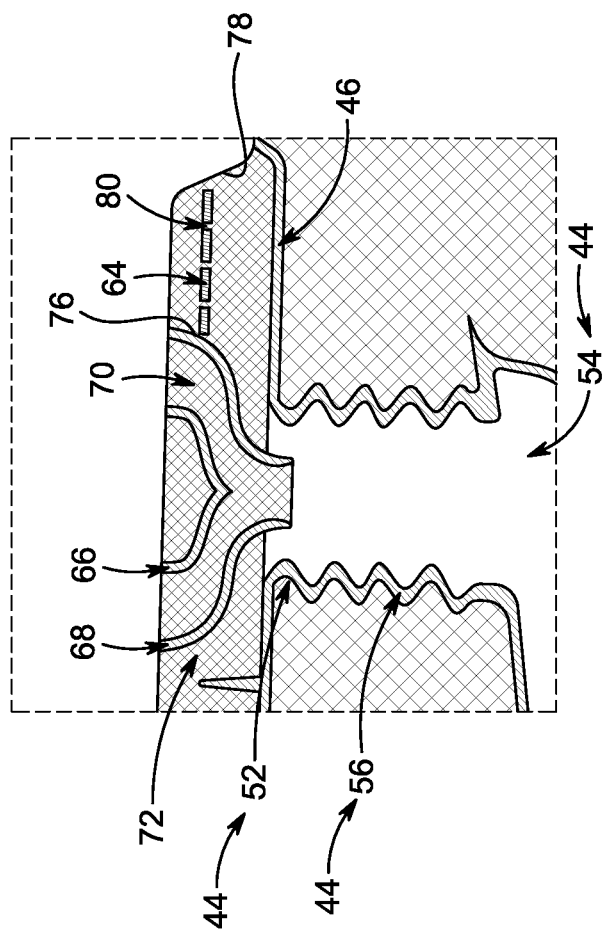
FIG. 7 is an enlarged section view of one of the plurality of conduits and the flow-directing skeleton of FIG. 5 showing one of the plurality of primary flow-discharge nozzles and one of a plurality of flow restrictors of the flow-directing skeleton.

Each conduit 44 is air impermeable and includes an outlet 52, a manifold section 54, and a suspension section 56 as shown in FIGS. 5-7. Outlet 52 disperses pressurized air 50 towards flow-directing skeleton 48 and an occupant. Manifold section 54 is coupled to manifold 42. Suspension section 56 extends between and interconnects manifold section 54 and fluid barrier 46. Suspension section 56 includes a plurality of bellows 58 which allow compression of suspension section 56 with the first and second plurality of suspension links 34, 36 in response to the load 17 being applied on cushion 24 as shown in FIG. 6.

Fluid barrier 46 is air impermeable to block the flow of air 50 from the second plurality of suspension links 36 to the first plurality of suspension links 34 after pressurized air 50 is discharged from the plurality of conduits 44 to the second plurality of suspension links 36. Therefore, pressurized air 50 that exits the plurality of conduits 44 into flow-directing skeleton 48 cannot flow downward through the first plurality of suspension links 34 which are not a part of the plurality of conduits 44.

Flow-directing skeleton 48 disperses pressurized air 50 exiting through an outlet 52 of each conduit 44 toward an occupant seated on the seat bottom 14 above the second plurality of suspension links 36. Flow-directing skeleton 48 includes a perimeter airflow barrier 60, a plurality of primary flow-discharge nozzles 62, and a plurality of flow restrictors 64. Perimeter airflow barrier 60 is coupled to and extends upwardly away from fluid barrier 46. Each of the plurality of primary flow-discharge nozzles 62 are arranged above an outlet 52 of a respective one of the plurality of conduits 44. Each of the plurality of flow restrictors 64 are arranged around a perimeter of a respective one of the plurality of primary flow-discharge nozzles 62.

As illustrated in FIG. 3, perimeter airflow barrier 60 is shaped into a silhouette of portions of an occupant resting on cushion 24. In other embodiments, perimeter airflow barrier 60 may be shaped in any configuration, including all or a portion of a top surface area 25 of cushion 24. Accordingly, each of the plurality of primary flow-discharge nozzles 62 and each of the plurality of flow restrictors 64 are arranged to lie within the silhouette defined by perimeter airflow barrier 60. In the illustrative embodiment shown in FIG. 3, the plurality of primary flow-discharge nozzles 62 includes six circular-shaped flow-discharge nozzles 62 and the plurality of flow restrictors 64 includes six circular-shaped flow restrictors 64. Two of the primary flow-discharge nozzles 62 and corresponding flow restrictors 64 are located near a forward end, or forward half, of cushion 24 corresponding with a region where the occupant's thighs rest. Four of the primary flow-discharge nozzles 62 and corresponding flow restrictors 64 are located near a rear end, or rear half, of cushion 24 corresponding with a region where the occupant's glutes rest. More force may be applied by the occupant to the region where the occupant's glutes rest. More primary flow-discharge nozzles 62 and corresponding flow restrictors 64 are located in this region to account for this.

In other embodiments, the plurality of flow-discharge nozzles 62 may include less than or more than six flow-discharge nozzles 62 and/or the plurality of flow restrictors 64 may include less than or more than six flow restrictors 64. Alternatively or additionally, each of the plurality of flow-discharge nozzles 62 and/or flow restrictors 64 may be have different sizes and/or shapes. Furthermore, the plurality of flow-discharge nozzles 62 and/or flow restrictors 64 may be arranged in any pattern rather than aligned in a grid pattern as shown in FIG. 3. In some embodiments, at least one of the plurality of discharge nozzles 62 and/or flow restrictors 64 may lie outside the silhouette of perimeter airflow barrier 60.

Each of the plurality of primary flow-discharge nozzles 62 includes an inner flow-directing cone 66 and an outer flow-directing cone 68 as shown in FIGS. 3-7. Outer flow-directing cone 68 surrounds and is spaced apart from inner flow-directing cone 66 to define a first flow passageway 70. Outer flow-directing cone 68 is also spaced apart from outlet 52 of a respective one of the plurality of conduits 44 to define a second flow passageway 72 spaced apart from first flow passageway 70. In some embodiments, each of the plurality of primary flow-discharge nozzles 62 may have additional flow-directing cones to create additional flow passageways.

As illustrated in FIGS. 3-7, each of the plurality of flow restrictors 64 includes an inner edge 76 coupled to an upper end of a respective outer flow-directing cone 68 and an outer edge 78 spaced apart from inner edge 76. Inner edge 76 and outer edge 78 of each of the plurality of flow restrictors 64 cooperate to define at least a portion of an upper boundary of second flow passageway 72. As shown in FIG. 3, each of the plurality of flow restrictors 64 is a solid sheet that includes a plurality of through-holes 80 which open into the second flow passageway 72. In other embodiments, each of the plurality of flow restrictors 64 may not be a solid sheet.

Additive manufacturing of cushion 24 allows for cushion 24 to be produced in one single part rather than requiring assembly of several separate parts for a seat cushion. Not only are costs of labor reduced with little or no assembly, but cushion 24 may be manufactured in a single facility rather than stamped, assembled, and shipped to and from separate facilities, therefore reducing the carbon footprint of manufacturing cushion 24 and/or ventilated vehicle seat 10. Additive manufacturing of cushion 24 also allows for flow-directing skeleton 48, for example, to have a complex network of flow passageways 70, 72 to direct pressurized air 50 evenly to areas of seat bottom 14. Additive manufacturing of cushion 24 further allows for customized flow-directing skeletons 48 for separate cushion 24 applications in different ventilated vehicle seats 10 in the same or different vehicles.

The invention claimed is:

1. A ventilated vehicle seat comprising
a seat foundation adapted to be coupled to a floor of a vehicle,
a seat bottom coupled to the seat foundation and spaced apart from the floor of the vehicle, and
a seat back coupled to the seat bottom and arranged to extend upwardly from the seat bottom and the seat foundation, the seat bottom and the seat back cooperate to define an occupant-support region adapted to support an occupant above the floor of the vehicle,
wherein the seat bottom includes an outer trim and a cushion at least partially covered by the outer trim, and
wherein the cushion is formed in one piece by additive manufacturing such that each component of the cushion is connected endlessly to one another and the cushion includes: (i) a suspension system including a first plurality of links defining a first plurality of repeated cells and a second plurality of suspension links defining a second plurality of repeated cells that are arranged to lie above the first plurality of repeated cells, the first plurality of repeated cells are different than the second plurality of repeated cells, and (ii) an air-management system including a manifold configured to receive pressurized air, a plurality of conduits coupled to the manifold and configured to direct the pressurized air toward different areas of the second plurality of suspension links, and a fluid barrier arranged to lie between the first plurality of suspension links and the second plurality of suspension links to block the flow of air from the second plurality of suspension links to the first plurality of suspension links after the pressurized air is discharged from the plurality of conduits to the second plurality of suspension links.

2. The vehicle seat of claim 1, wherein the air-management system further includes a flow-directing skeleton integrated into the second plurality of suspension links and configured to disperse the pressurized air exiting through an outlet of each conduit toward the occupant seated on the seat bottom above the second plurality of suspension links.

3. The vehicle seat of claim 2, wherein the flow-directing skeleton includes a perimeter airflow barrier coupled to and that extends upwardly away from the fluid barrier, a plurality of primary flow-discharge nozzles, each primary flow-discharge nozzle being arranged above an outlet end of a respective one of the plurality of conduits, and a plurality of flow restrictors, each flow restrictor being arranged around a perimeter of a respective primary flow-discharge nozzle.

4. The vehicle seat of claim 3, wherein the perimeter airflow barrier is shaped into a silhouette of portions of the occupant resting on the cushion and each of the primary flow-discharge nozzles and flow restrictors are arranged to lie within the silhouette.

5. The vehicle seat of claim 2, wherein each of the primary flow-discharge nozzles includes an inner flow-directing cone and an outer flow-directing cone that surrounds the inner flow-directing cone and that is spaced apart from the inner flow-directing cone to define a first flow passageway and that is spaced apart from the outlet of each respective conduit to define a second flow passageway spaced apart from the first flow passageway.

6. The vehicle seat of claim 5, wherein each flow restrictor includes an inner edge coupled to an upper end of the outer flow-directing cone and an outer edge spaced apart from the inner edge and that defines at least a portion of an upper boundary of the second flow passageway.

7. The vehicle seat of claim 6, wherein each flow restrictor is solid sheet that is formed to include a plurality of through-holes opening into the second flow passageway.

8. The vehicle seat of claim 1, wherein the first plurality of cells each have a first volume and the second plurality of cells each have a second volume less than the first volume.

9. The vehicle seat of claim 8, wherein the first plurality of links each have a first thickness and the second plurality of links each have a second thickness less than the first thickness.

10. The vehicle seat of claim 9, wherein the first plurality of links have a first stiffness and the second plurality of links have a second stiffness less than the first stiffness.

11. The vehicle seat of claim 1, wherein each of the conduits includes a manifold section coupled to the manifold and a suspension section that extends between and interconnects the manifold section and the fluid barrier, the suspension section including a plurality of bellows that allow compression of the suspension section in response to a load being applied on the cushion.

12. The vehicle seat of claim 1, wherein the cushion is formed without any structural seat frame elements.

13. A ventilated vehicle seat comprising
a seat foundation adapted to be coupled to a floor of a vehicle,
a seat bottom coupled to the seat foundation and spaced apart from the floor of the vehicle, and
a seat back coupled to the seat bottom and arranged to extend upwardly from the seat bottom and the seat foundation, the seat bottom and the seat back cooperate to define an occupant-support region adapted to support an occupant above the floor of the vehicle,
wherein at least one of the seat bottom and the seat back includes an outer trim and a cushion at least partially covered by the outer trim,
wherein the cushion includes: (i) a suspension system including a first plurality of suspension links defining a first plurality of repeated cells and a second plurality of suspension links defining a second plurality of repeated cells that are arranged to lie above the first plurality of repeated cells, the first plurality of repeated cells are different than the second plurality of repeated cells, and (ii) an air-management system integrated into the first and second plurality of suspension links and configured to direct pressurized air toward the occupant-support region.

14. The vehicle seat of claim 13, wherein the cushion is configured to change from an undeformed state prior to an occupant applying a load on the seat bottom, to a deformed state in response to the load being applied on the seat bottom, and wherein the pressurized air flowing through the second plurality of suspension links has a first flow rate in the undeformed state and a second flow rate in the deformed state, the first flow rate is about equal to the second flow rate.

15. The vehicle seat of claim 14, wherein the air-management system includes a manifold, a plurality of conduits configured to direct pressurized air from the manifold toward different areas of the second plurality of suspension links, and a fluid barrier arranged to lie between the first plurality of suspension links and the second plurality of suspension links to block the flow of air from the second plurality of suspension links to the first plurality of suspension links after the pressurized air is discharged from the plurality of conduits to the second plurality of suspension links.

16. The vehicle seat of claim 13, wherein the first plurality of links have a first stiffness and the second plurality of links have a second stiffness less than the first stiffness.

17. The vehicle seat of claim 13, wherein the air-management system further includes a flow-directing skeleton integrated into the second plurality of suspension links and configured to disperse the pressurized air exiting through an outlet of each conduit toward the occupant seated on the seat bottom above the second plurality of suspension links, and
wherein the flow-directing skeleton includes a perimeter airflow barrier coupled to and that extends upwardly away from the fluid barrier, a plurality of primary flow-discharge nozzles, each primary flow-discharge nozzle being arranged above an outlet end of a respective one of the plurality of conduits, and a plurality of flow restrictors, each flow restrictor being arranged around a perimeter of a respective primary flow-discharge nozzle.

18. An occupant support comprising
a seat foundation and
an occupant-support base coupled to the seat foundation;
wherein the occupant-support base includes an outer trim and a cushion at least partially covered by the outer trim and formed in one-piece by additive-manufacturing such that each component of the cushion is connected endlessly to one another, and
wherein the cushion includes: (i) a suspension system including a first plurality of suspension links defining a first plurality of repeated cells and a second plurality of suspension links defining a second plurality of repeated cells that are arranged to lie above the first plurality of repeated cells, the first plurality of repeated cells are different than the second plurality of repeated cells, and (ii) an air-management system including a manifold configured to receive pressurized air, a plurality of conduits coupled to the manifold and configured to direct the pressurized air toward different areas of the second plurality of suspension links, and a fluid barrier arranged to lie between the first plurality of suspension links and the second plurality of suspension links to block the flow of air from the second plurality of suspension links to the first plurality of suspension links after the pressurized air is discharged from the plurality of conduits to the second plurality of suspension links.

19. The occupant support of claim 18, wherein the occupant-support base is at least one of a seat bottom and a seat back for a vehicle seat.

20. The occupant support of claim 18, wherein the air-management system further includes a flow-directing skeleton integrated into the second plurality of suspension links and configured to disperse the pressurized air exiting through an outlet of each conduit toward the occupant seated on the seat bottom above the second plurality of suspension links, and
wherein the flow-directing skeleton includes a perimeter airflow barrier coupled to and that extends upwardly away from the fluid barrier, a plurality of primary flow-discharge nozzles, each primary flow-discharge nozzle being arranged above an outlet end of a respective one of the plurality of conduits, and a plurality of flow restrictors, each flow restrictor being arranged around a perimeter of a respective primary flow-discharge nozzle.

* * * * *